United States Patent
Kitayama et al.

(10) Patent No.: US 7,683,533 B2
(45) Date of Patent: Mar. 23, 2010

(54) ORGANIC ELECTROLUMINESCENT DEVICE PROVIDED WITH A POLARIZING PLATE, A PRISM MEMBER AND A PHASE MEMBER IN A STACKED ARRANGEMENT

(75) Inventors: Hiroyuki Kitayama, Isehara (JP); Yoichi Osato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 532 days.

(21) Appl. No.: 11/683,019

(22) Filed: Mar. 7, 2007

(65) Prior Publication Data

US 2007/0230158 A1 Oct. 4, 2007

(30) Foreign Application Priority Data

Mar. 31, 2006 (JP) .............................. 2006-098001

(51) Int. Cl.
*H01L 51/52* (2006.01)
*H01J 5/16* (2006.01)
*H05B 33/02* (2006.01)

(52) U.S. Cl. ....................... 313/501; 313/503; 313/506; 313/110; 313/112; 313/111

(58) Field of Classification Search ......... 313/498–512, 313/110–116
See application file for complete search history.

(56) References Cited

U.S. PATENT DOCUMENTS

| | | | |
|---|---|---|---|
| 6,804,058 B1 * | 10/2004 | Ouderkirk et al. ........... | 313/112 |
| 7,440,044 B2 * | 10/2008 | Peterson et al. ............. | 313/503 |
| 2002/0000772 A1 | 1/2002 | Kitahara ..................... | 313/503 |
| 2004/0263039 A1 * | 12/2004 | Takei et al. ................. | 313/110 |
| 2005/0007793 A1 | 1/2005 | Yoshida et al. .............. | 362/558 |
| 2005/0242709 A1 * | 11/2005 | Yamauchi .................... | 313/498 |
| 2007/0085476 A1 * | 4/2007 | Hirakata et al. ............. | 313/506 |
| 2007/0230211 A1 * | 10/2007 | Osato et al. ................. | 362/600 |

FOREIGN PATENT DOCUMENTS

| | | |
|---|---|---|
| JP | 04-067016 | 3/1992 |
| JP | 06-308485 | 11/1994 |
| JP | 11-097169 | 4/1999 |
| JP | 2002-006776 | 1/2002 |
| JP | 2002-216947 | 8/2002 |
| JP | 2005-055481 | 3/2005 |

* cited by examiner

*Primary Examiner*—Mariceli Santiago
(74) *Attorney, Agent, or Firm*—Fitzpatrick, Cella, Harper & Scinto (57) ABSTRACT

An organic EL light-emitting apparatus includes a base, an organic EL device, a prism member, a polarizing member, and a phase member. The prism member, the polarizing member, and the phase member are adjacent to a light extraction side of the organic EL device. The prism member includes a plurality of unit prisms each having a triangular-column shape. The unit prisms are arranged such that their longitudinal directions are parallel to one another. The polarizing member is disposed further from the base than the prism member. The prism member has an apex angle between 90° to 140°.

2 Claims, 5 Drawing Sheets

ORGANIC ELECTROLUMINESCENT DEVICE PROVIDED WITH A POLARIZING PLATE, A PRISM MEMBER AND A PHASE MEMBER IN A STACKED ARRANGEMENT

BACKGROUND OF THE INVENTION

1. Field of the Invention

The present invention relates to an organic electroluminescent (EL) light-emitting apparatus including a prism member, a polarizing member, and a phase member disposed at a light extraction side.

2. Description of the Related Art

In a self-light-emitting device (e.g., an organic EL device), light incident at an angle larger than a critical angle on an interface having a larger index difference, such as that between a substrate of the device and air, is totally reflected. Therefore, actually only approximately 20% of the total amount of emitted light can be extracted to the outside. To address this problem, a technique to increase the efficiency of light extraction by providing projections and depressions to a light-extraction surface of the device is proposed.

One technique to increase brightness in a known display apparatus is described in Japanese Patent Laid-Open No. 4-67016 and No. 6-308485. The technique causes light from a backlight source to efficiently converge to the front observation direction via a prism member having an optimal shape (e.g., triangular column, quadrangular pyramid) inserted in a path over which the light is guided to a liquid crystal display panel.

Japanese Patent Laid-Open No. 2005-55481 discloses an organic EL panel, which has a self-light-emitting light source. With the aim of sufficiently improving brightness, the organic EL panel is provided with a prism member.

Japanese Patent Laid-Open No. 2002-216947 discloses another organic EL panel, which has a self-light-emitting light source. With the aim of providing the organic EL display apparatus with bright display conditions with low power consumption, the organic EL panel is overlaid with a circular polarizer and a microlens sheet.

Japanese Patent No. 3,543,951 discloses another organic EL panel, which has a self-light-emitting light source. With the aim of providing an image display apparatus that can increase brightness observed from the front of a display screen without distorting a displayed image, the organic EL panel is overlaid with a prism sheet and a circular polarizing filter.

However, the above patent documents do not sufficiently study an application of a prism member to a light emitting apparatus that projects less glare of outside light. For an arrangement that has a prism member and a circular polarizer, the prism member contributes to an improvement in the efficiency of light extraction and the circular polarizer contributes to a reduction in reflection of outside light. However, the prism member affects the reflection of outside light and that property must be taken into account when reduction of glare is desired. Japanese Patent No. 3,543,951, which is mentioned above, discloses an arrangement that has a prism sheet and a circular polarizing filter, but does not describe the influence of the prism sheet on the reflection of outside light. It is necessary to consider the positions and the structures of components in an arrangement that has the prism member and the circular polarizer.

SUMMARY OF THE INVENTION

The present invention provides an organic EL light-emitting apparatus that has efficiency of light extraction increased by the provision of a specific prism member and a circular polarizer to a self-light-emitting device, such as an organic EL device. The EL light emitting apparatus emits more light by a reduction in the reflection of outside light.

An aspect of the present invention provides an organic electroluminescent (EL) light-emitting apparatus which includes a base, an organic EL light-emitting device, a phase member, a polarizing member, and a prism member. The organic EL light-emitting device is disposed on the base and has a pair of electrodes and an organic compound layer disposed between the pair of electrodes. The phase member is adjacent to a light extraction side of the organic EL light-emitting device. The polarizing member is adjacent to a light extraction side of the phase member. The prism member is adjacent to a side of the polarizing member that faces the base and includes a plurality of unit prisms each having a triangular-column shape. The unit prisms are arranged such that their longitudinal directions are parallel to one another. The prism member has an apex angle between 90° to 140°.

The present invention can improve efficiency of extracted light by the provision of the prism member and the circular polarizer to the self-light-emitting device (e.g., organic EL device) and can reduce reflection of outside light.

Further features of the present invention will become apparent from the following description of exemplary embodiments with reference to the attached drawings.

DESCRIPTION OF THE EMBODIMENTS

An organic EL light-emitting apparatus according to an exemplary embodiment of the present invention includes an organic EL light-emitting device that emits light in an organic compound layer disposed between a pair of electrodes above a base. The organic EL light-emitting apparatus also includes a prism member, a polarizing member, and a phase member at a light extraction side of the organic EL light-emitting device. The polarizing member converts natural light to linearly polarized light and is called a linearly polarizing member. The phase member generates an optical path difference for a quarter of wavelength between linearly polarized light components oscillating in directions perpendicular to each other and is also called a λ/4 phase member. The polarizing member and the phase member are also collectively called a circular polarizer. The placement of these two members at the light extraction side of the organic EL light-emitting device can reduce reflection of outside light.

Figure 3:
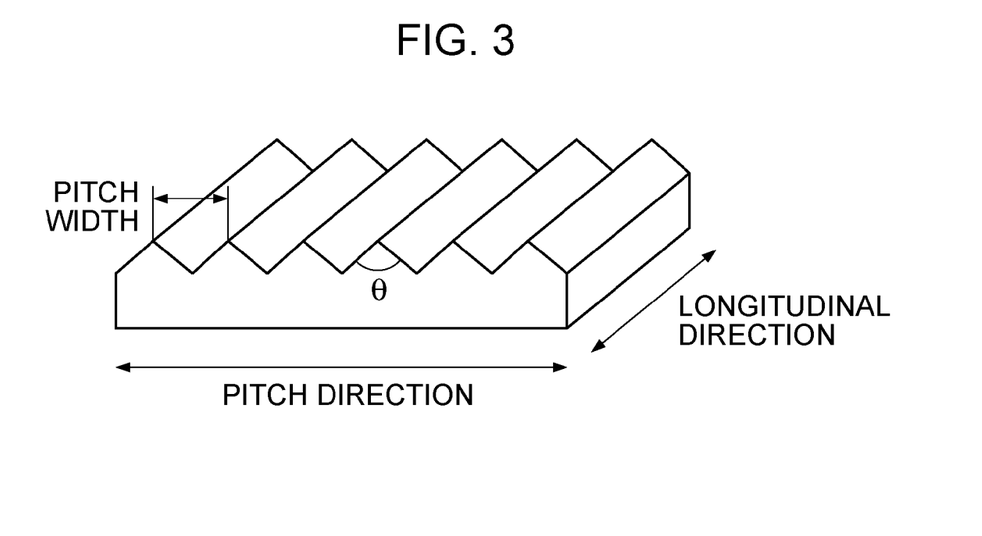
FIG. 3 illustrates a prism member used in the organic EL light-emitting apparatus.

The prism member includes a plurality of unit prisms each having the shape of a triangular column. The unit prisms are arranged such that their longitudinal directions are parallel to one another. More specifically, for the prism member shown in FIG. 3, each of the unit prisms is indicated by a single projection or mountain of the prism member. Each of the longitudinal direction axes shows an axial direction of the triangular column of the unit prism.

In the exemplary embodiment, the polarizing member is disposed closer to the light extraction side than the prism member (i.e., disposed further from the base than the prism member). The prism member has an apex angle between 90° and 140°. The apex angle is indicated by θ shown in FIG. 3. The position of the polarizing member closer to the light extraction side than the prism member and the limitation of the apex angle to the above numerical range enables the polarizing member to prevent light reflected by the surface of the prism member from being emitted, thus reducing the reflection of outside light.

Exemplary embodiments of the present invention are described below with reference to the drawings.

Figure 1A:
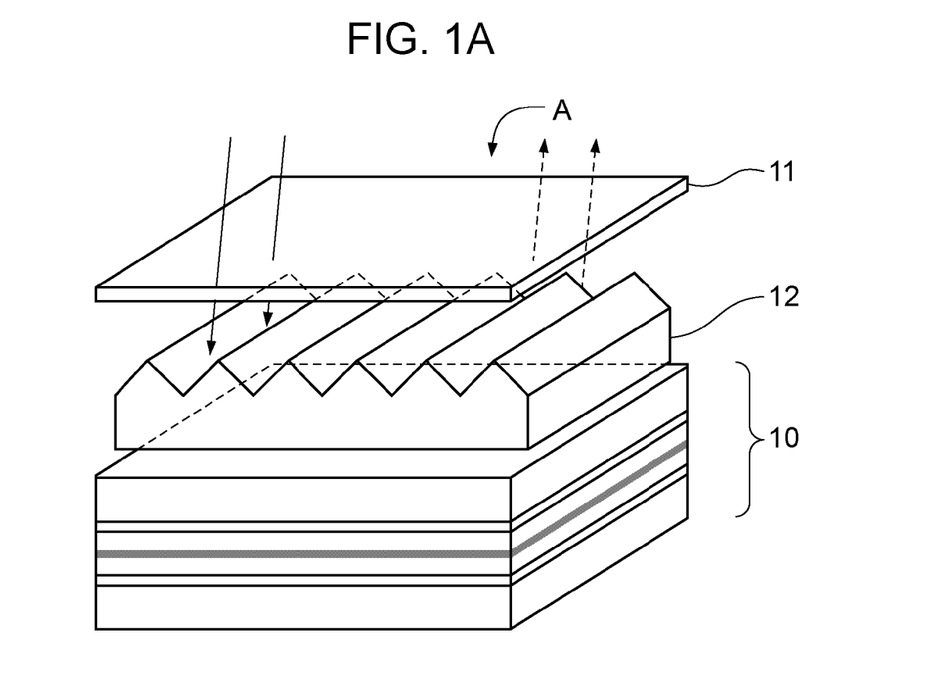
FIGS. 1A and 1B illustrate exemplary arrangements that include optical components at a light extraction side of an organic EL device in a display panel according to an embodiment of the present invention.

FIG. 1A illustrates an organic EL light-emitting apparatus according to an exemplary embodiment of the present invention. The organic EL light-emitting apparatus includes an organic EL device 10, a circular polarizer 11 including a polarizing member and a phase member, and a prism member 12. In this exemplary embodiment, the polarizing member, the phase member, the prism member, and the organic EL device are disposed in this order from a light extraction side A (i.e., from the top side of the drawing).

Light emitted from the organic EL device 10 is refracted by a prismatic surface while passing through the prism member 12. The refracted light is converged to a front direction, passes through the circular polarizer 11, and is extracted (dotted arrows) to an observation direction at the light extraction side A.

In contrast, outside light incident from the outside of a panel passes through (solid arrows, B) the circular polarizer 11. A circularly polarized light component passes through the prism member 12 and then is reflected by a reflecting electrode of the organic EL device 10. The rotation direction of the circularly polarized light is inverted while being reflected. The reflected light passes through the prism member 12 and then enters the circular polarizer 11. At this time, the circularly polarized light component, which has the inverted rotation direction, is absorbed. Therefore, incident outside light from the outside of the light-emitting apparatus is not extracted to the observation direction, so the reflection of outside light is reduced.

Figure 1B:
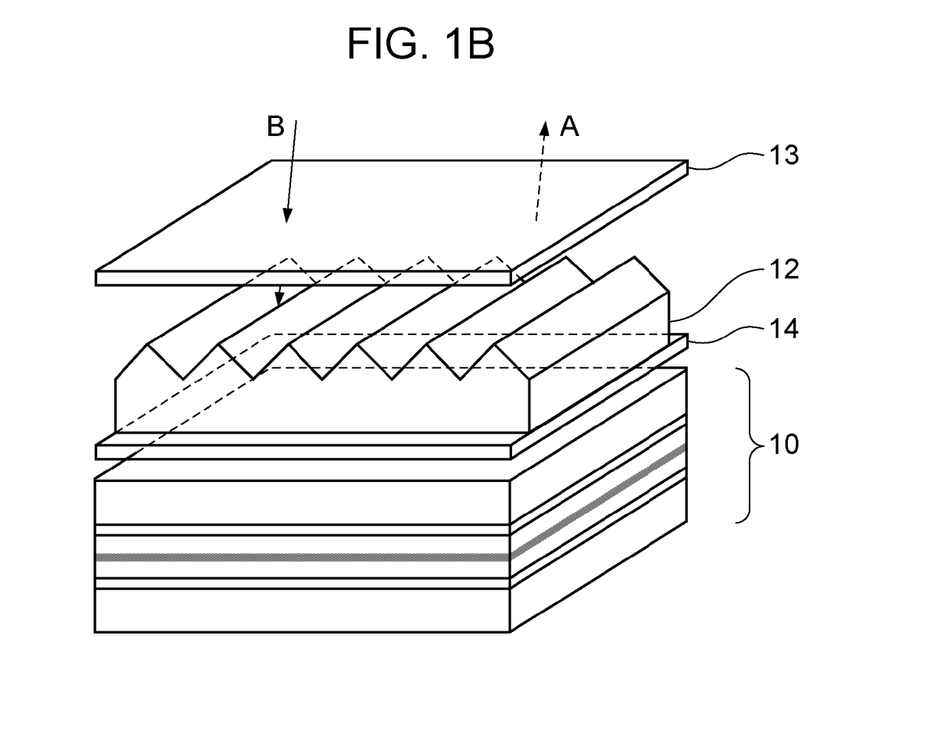

FIG. 1B illustrates the organic EL light-emitting apparatus according to another exemplary embodiment of the present invention. This organic EL light-emitting device includes a polarizing member 13 and a phase member 14. In this exemplary embodiment, the polarizing member, the prism member, the phase member, and the organic EL device are positioned in this order from the light extraction side A (i.e., from the top side of the drawing).

In this case, light emitted from the organic EL device is refracted while passing through the phase member 14 and the prism member 12. The refracted light is converged to the front direction, passes through the polarizing member 13, and then is extracted to the observation direction. In contrast, outside light B incident from the outside of the panel passes through the polarizing member 13. When a polarized light component passes through the prism member 12 and the phase member 14, the light component becomes circularly polarized light. The circularly polarized light is reflected by the reflecting electrode of the organic EL device 10. The rotation direction of the circularly polarized light is inverted while being reflected. When the reflected light passes through the phase member 14 and the prism member 12, the light becomes linearly polarized light that is rotated 90°. The reflected light enters the polarizing member 13. At this time, the polarized light component, which has been rotated 90°, is absorbed. Therefore, incident outside light from the outside of the light-emitting apparatus is not extracted to the observation direction, so the reflection of outside light is reduced.

As described above, incident light B that passes through the prism member 12 tends to be absorbed and reflection of outside light is reduced. However, the inventors found that all the light reflected by the surface of the prism member was not necessarily absorbed by the polarizing member. That is, as will be described below, depending on the incident direction of the outside light and the apex angle of the prism, light reflected by the surface of the prism member may undesirably pass through the polarizing member and be emitted to the exterior of the apparatus in some cases. Components included in the organic EL light-emitting apparatus according to the exemplary embodiments are described in greater detail below.

Prism Member

The prism member includes a plurality of projections opposite to a surface in contact with a light extraction surface of the organic EL device and transmits light. The projections according to the exemplary embodiments are shaped such the longitudinal directions of the plurality of unit prisms each having a triangular column are parallel to one another.

A prism member that has the shape of a triangular column is commercially available as a brightness enhancement film for background light, so an advantage of introducing the prism member with low costs is offered.

The height and the shape of the bottom of each of the projections can be optimized and the triangular columns can be laid such that the slope of the surface of the projection is close to a predetermined angle. The base can be about 1 μm to 100 μm and the height can be about 0.1 μm to 200 μm.

For preventing the prism member from exhibiting color due to influence of diffraction, the pitch width of the projections can be 1 μm or more. For avoiding image blurring when observing the panel, the pitch width can be a size (typically about 100 μm) that does not exceed the pixel pitch.

To produce the prism member, a pattern of projections is formed by the use of a light-transmitting sheet. Examples of a material of the sheet include polymethyl methacrylate (PMMA), polycarbonate (PC), triacetyl cellulose (TAC), and glass. These materials have substantially the same indices of refraction (from 1.49 to 1.57).

For providing a circular polarizer at a light extraction side of the prism member to prevent reflection of outside light, a material that has smaller birefringence can be selected as the material of the sheet.

To produce the projections, a resist pattern of projections is first formed by photolithography, and a pattern-transferred mold of depressions is formed by electroforming. Then a pattern of projections is obtained by molding the light-transmitting sheet by heating and pressing using the mold of depressions. Alternatively, the pattern of projections is formed by a process of transferring a pattern of projections to the sheet using a photocurable resin and then curing the photocurable resin with ultraviolet rays.

To produce a pattern of triangular-column projections used as a brightness enhancement film for backlight for a liquid crystal display, a cylindrical mold may be used. In this case, a cylinder subjected to a planarization process by, for example, copper plating is rotated and cut by a diamond cutting tool so that a pattern of depressions having a predetermined grooved shape is formed. Then, a pattern of projections is formed by using the cylinder as in a printing process. That is, a photocurable resin is placed in the grooves of the cylinder, and the pattern of projections is transferred to the surface of the light-transmitting sheet by the photocurable resin while the cylinder is rotated. Then, the pattern of projections is cured by ultraviolet radiation. This process is advantageous in that an excellent pattern of projections can be obtained even when the thickness of the light-transmitting sheet member is reduced to several microns and the mold and the prism member can be produced at low cost.

Polarizing Member (Linearly Polarizing Member)

The polarizing member is a filter that extracts linearly polarized light that oscillates only in a fixed or predetermined direction based on light oscillating in all directions. For example, a uniaxially stretched polyvinyl alcohol film with absorbed oriented dichroic dye, such as iodine, can be used as the polarizing member. In this case, a stretched direction in a plane of the polarizing member is a direction of an absorption axis, whereas a direction perpendicular thereto is a direction of a polarization axis. An absorption coefficient in the direction of the absorption axis is larger than that in the direction of the polarization axis. Therefore, transmittance in the direction of the absorption axis is smaller than that in the direction of the polarization axis.

Phase Member ($\lambda/4$ Phase Member)

The phase member produces light with a phase difference from the light in the polarized state emitted from the polarizing member. In the exemplary embodiments of the present invention, the phase member provides a phase difference of about $\lambda/4$ and functions to convert the polarized state of linearly polarized light into that of circularly polarized light and vice versa. One example of a material of the phase member is a polycarbonate uniaxially stretched film.

Circular Polarizer

The circular polarizer is a laminated product of the polarizing member and the phase member. In the exemplary embodiments, the polarizing member is disposed at the light extraction side A (i.e., further from the base). Light passing through the circular polarizer is converted into circularly polarized light. Circularly polarized light passing through the circular polarizer is converted into linearly polarized light when passing through the phase member. Since circularly polarized light that passed through the circular polarizer once and was then reflected, is converted into polarized light having a direction perpendicular to the polarizing member when passing through the circular polarizer a second time, the light is absorbed by the polarizing member and thus cannot pass therethrough.

Organic EL Device

The organic EL device can have a well-known structure and can be formed from well-known materials.

Figure 2:
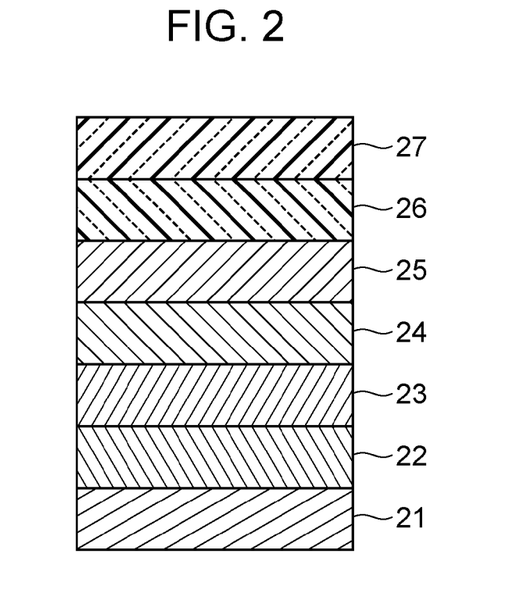
FIG. 2 illustrates an exemplary structure of the organic EL device used in an organic EL light-emitting apparatus according to an exemplary embodiment of the present invention.

FIG. 2 is a cross-sectional view of an exemplary structure of a top-emission organic EL device. A substrate 21 provided with a driving circuit is overlaid with an organic EL film, including a hole transport layer, a light-emitting layer, and an electron transport layer, by vacuum deposition.

The substrate 21 has chromium anode electrodes 22 each having a thickness of 50 nm and an area of 100 $\mu m^2$ arranged at a pitch of 200 $\mu m$ in the form of a two-dimensional pattern. A material of each of the anode electrodes may be aluminum or silver, which has a high reflectance, instead of chromium. To improve hole injection, a conductive transparent film, such as ITO and IZO, may be stacked on the substrate 21.

First, as a hole transport layer 23, which is an organic EL material, an α-NPD (α-naphtylphenyldiamine) layer having a thickness of 20 nm is stacked. Then, as a light-emitting layer 24, an Alq3 (tris(8-hydroxyquinolinato)aluminum(III)) layer having a thickness of 30 nm is stacked. Then, as an electron injection layer 25, a composite layer of cesium carbonate and Alq3 having a thickness of 50 nm is stacked.

Then, as a transparent cathode electrode 26, an ITO layer having a thickness of 60 nm is stacked by sputtering. In this manner, the organic EL device is formed. Similar EL devices can be conventionally formed using well known compounds.

For this device structure, it is known that EL light emission of Alq3 molecules occurs in an interface between the hole transport layer 23 and the Alq3 light-emitting layer 24.

To prevent water from penetrating the organic EL film, as a light-transmitting protective film 27, a SiN layer having a thickness of 640 nm is stacked by sputtering. In this manner, the formation of organic EL device is completed.

Japanese Patent Laid-Open No. 11-97169 discloses that a layer formed from an oxide, a nitride, or a sulfide whose chief ingredient is silicon, boron, germanium, or other materials is suited for the light-transmitting protective film. The film thickness for ensuring blocking effectiveness for oxygen and water is about 300 nm to 10 $\mu m$. In consideration of reducing the film stress and increasing productivity by reducing time of deposition, the thickness can be about 300 nm to 5 $\mu m$. The apex angle of the prism specified in the exemplary embodiments of the present invention will be described below.

Improvement in Light Extraction

To calculate efficiency of light extraction of EL light emission for different apex angles of the prism, a commercially available ray tracing simulation software application was used. The set conditions of the ray tracing simulation are described below.

(1) Settings of Light Emission

EL light emission: Full diffusive light emission from the central plane of the light-emitting layer Number of rays of light: 2000 Monte Carlo simulation Number of Fresnel branches: 50

(2) Settings of Parameters in Structure System

Anode Electrode: Perfect Reflection

Light-emitting Layer: Index 1.70 Thickness 0.13 $\mu m$

Cathode Electrode: ITO Index 2.00 Thickness 0.05 $\mu m$

Protective Layer: Index 1.53 Thickness 50.0 $\mu m$

Prism: Index 1.53 Apex angle 20° to 160° Pitch width 20 $\mu m$ End-face Fresnel reflection The efficiency of light extraction was calculated by determining the ratio of rays of light that passes through a top surface of the EL device (protective layer or prism) and heads toward the outside of the device with respect to all rays of emitted light. A flat type, in which the prism member was not included, was used as a comparative example.

Table 1 shows the simulation result of efficiency of light extraction for an apex angle of the prism varying from 20° to 160°.

The efficiency of light extraction according to the exemplary embodiment increased about slightly less than twice that of the flat type. However, when the apex angle exceeded 140°, the efficiency of light extraction according to the exemplary embodiment was close to that of the flat type. Therefore, from the viewpoint of improving the efficiency of light extraction, the apex angle of the prism can be between 60° to 140°.

Antireflection for Outside Light

The consideration of antireflection for outside light is described below. As described above, if the prism member merely transmits light, reflection of outside light can be prevented by a combination of the prism member and the circular polarizer.

However, the following factors are required to be considered.

(1) Since the prismatic surface has projections and depressions, the behavior of outside light incident on the prismatic surface varies depending on the incident angle with respect to the prismatic surface.

(2) A phase inversion occurs when the incident angle is large (55° or more, as will be described below).

(3) The presence of phase inversion varies depending on the number of reflections within the prism member.

In other words, the antireflection effects for outside light vary with the incident angle of the outside light and the presence of the phase inversion.

Table 2 shows the result of reflectance of natural light and p-polarized light with respect to the incident angle when natural outside light enters a planar layer having an index of 1.5 from the air layer and also shows calculation of each phase change of both light on reflection, on the assumption that the prism member in contact with the air layer would be used. Here, the reflectance of the natural light is the average of that of the p-polarized light and that of s-polarized light.

When the incident angle is large, i.e., incidence occurs in a slanting direction, both the p-polarized light and the natural light tend to have high reflectance. However, since an increase in the reflectance of the p-polarized light is smaller than that of the natural light, for reducing reflection by use of the prism member, the p-polarized light can be selected. For the p-polarized light, the reflectance is less than 3% up to an incident angle of 65°.

The dependence of reflectance on the incident angle is described in, for example, page 35, "Ohyo Kogaku", TURUTA Tadao, Baifukan Co., Ltd. 1990. As will be described below, it is necessary to consider that the phase inversion occurred for an incident angle larger than 55°.

For an arrangement illustrated in FIG. 1B, in the case of incident outside light from the outside of the panel at an incident angle smaller than 55°, light that passed through the linearly polarizing member and then was reflected by the surface of the prism member passes through the linearly polarizing member and then exits out of the display panel. This light overlaps EL emitted light and thus causes glare, and as a result, display quality is degraded.

In the case of incident outside light at an incident angle larger than 55°, since the phase inversion occurs when the light is reflected by the surface of the prism member, the light is absorbed by the linearly polarizing member and thus reflection of incident outside light does not occur. In this case, reflection at an interface between the prism member and the air is below 3% for all incident angles. With antireflection (AR) coating, it is easy to be below 1%.

As is obvious from the above, the antireflection effects for outside light vary with the incident angle of the outside light and the behavior of the phase inversion.

Additionally, it is necessary to consider a phase inversion in the case in which light is reflected by the prismatic surface a plurality of times.

Outside light passes through the linearly polarizing member, and a polarized light component of the outside light enters the prismatic surface of the prism member. Since the prismatic surface is inclined, the incident angle of the outside light is large because of superposition. For example, outside light incident from a front direction on the surface of a prism that has an apex angle of 60° is effectively 60° oblique incidence. In this case, the light is reflected by the prismatic surface a plurality of times and this is observed as the reflection of outside light. In particular, for a prism that has an apex angle smaller than 60°, a plurality of reflections occur in many rays, so that the reflection of incident outside light is increased.

For the p-polarized light, when the incident angle is equal to or smaller than 55°, the phase inversion does not occur; when the incident angle is larger than 55°, the phase inversion occurs. For example, when the p-polarized light is reflected an even number of times at an incident angle of 55°, reflected light is not absorbed in the polarizer, so that the reflection of outside light occurs.

The above consideration reveals that, if outside light is reflected by the prismatic surface more than once, an arrangement shown in FIG. 1B cannot obtain sufficient antireflection for outside light. An arrangement shown in FIG. 1A has a similar result.

In the case in which a plurality of reflections occur, as described above, a complex phase change occurs. Therefore, a simulation prediction by ray tracing is effective, and it is necessary to actually check the state of reflection of outside light.

By ray tracing by use of the commercially available software application, which is described above, for different incident angles of outside light and different apex angles of the prism, the angle of reflected light and the presence/absence of a plurality of reflections were examined. Unfortunately, when a plurality of reflections occurred and the incident angle on reflection was larger than 55°, the evaluation is ×. In contrast, when a plurality of reflections did not occur and the incident angle on reflection was smaller than 55°, the evaluation is ○. When two reflections occurred in only a specific incident angle of outside light (the front) (the incident angle on reflection was smaller than 55°), the evaluation is Δ.

Table 3 shows the result of this experiment. For an apex angle of the prism of 60° or less, a plurality of reflections occurred in almost all of the incident angles, and therefore, antireflection effects for outside light is not expected. For an apex angle of the prism between 90° and 120°, two reflections slightly occurred in the case of outside light incident from the front direction. For an apex angle of the prism of 130° or more, only one reflection occurred and the incident angle on reflection was smaller than 55°, and therefore, excellent antireflection effects for outside light are expected.

Figure 4:
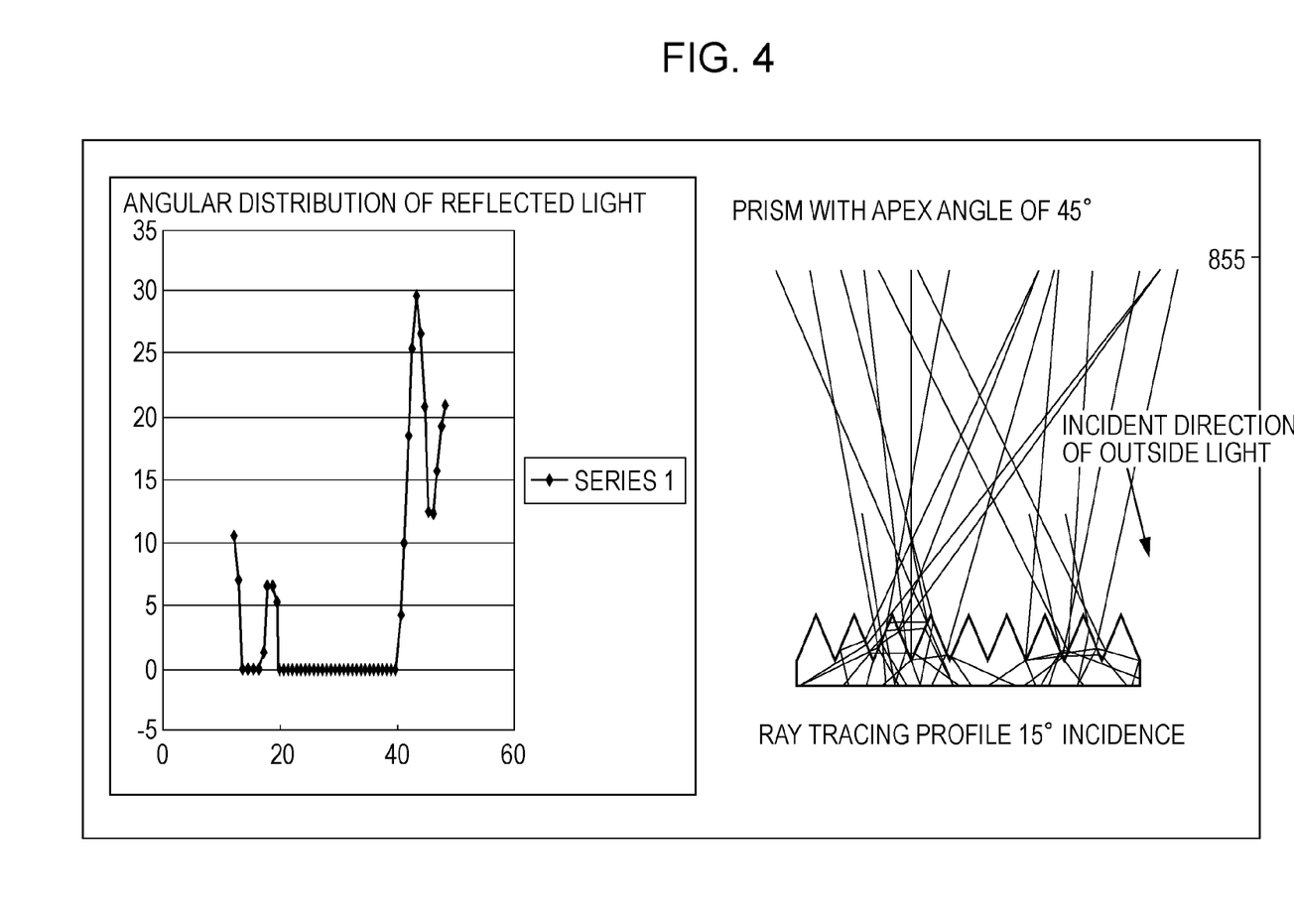
FIG. 4 illustrates a characteristic of an emission angle of reflection of incident outside light on a prism member having an apex angle of 45° and an incident angle of 15°.
Figure 5:
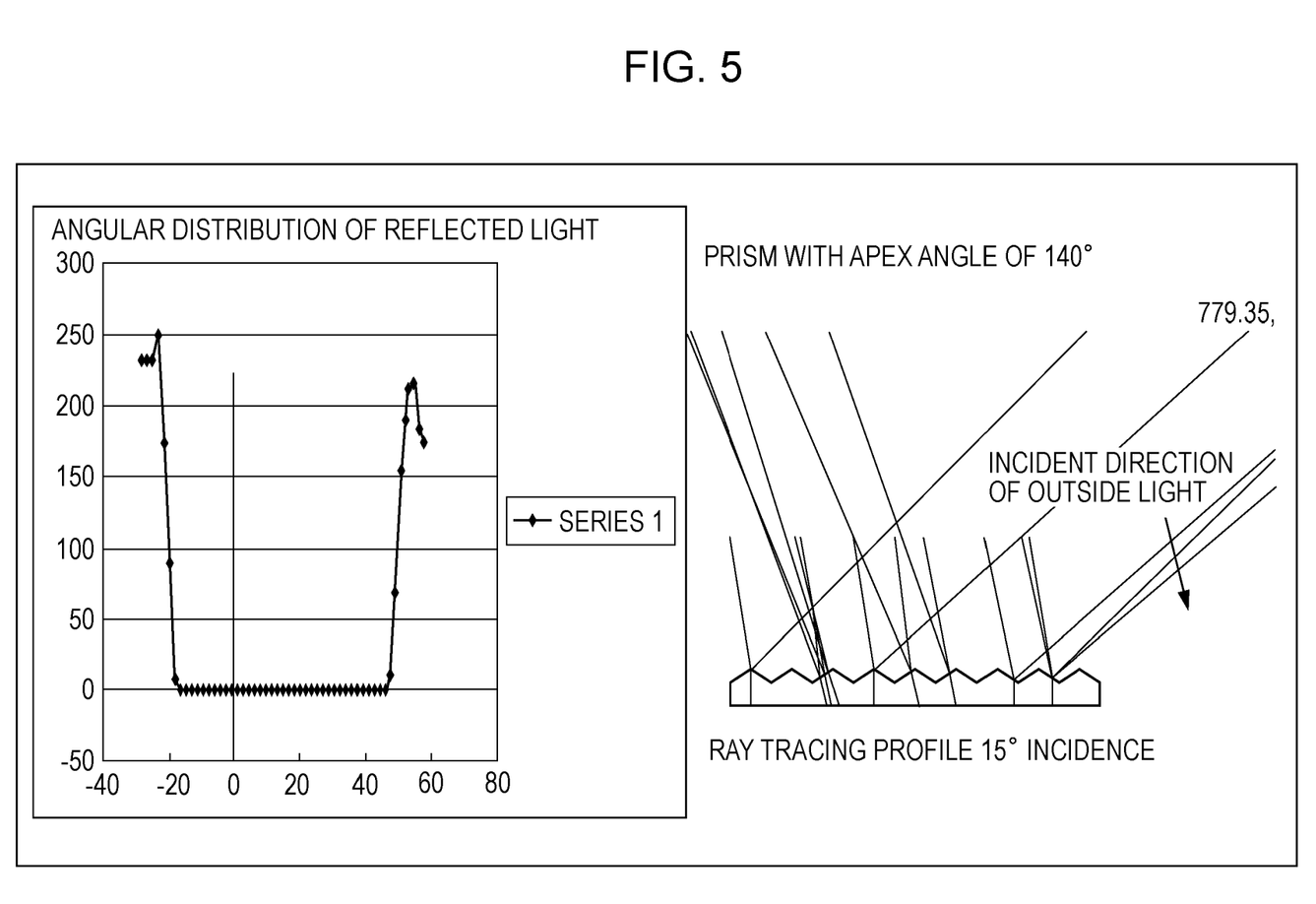
FIG. 5 illustrates a characteristic of an emission angle of reflection of incident outside light on a prism member having an apex angle of 140° and an incident angle of 15°.

FIGS. 4 and 5 show simulation examples. FIG. 4 shows an example of an evaluation of ×. On a condition that the apex angle of the prism is 45° and outside light is incident at an angle of 15°, multiple reflections will occur in almost all rays. FIG. 5 shows an example of an evaluation of ○. On a condition that the apex angle of the prism is 140° and outside light is incident at an angle of 15°, only one reflection occurs and the incident angle on the prismatic surface is 5° and 55°.

The above consideration and simulation reveals that an apex angle of the prism of 90° or more can reduce the reflection of outside light.

The foregoing shows that, for improving the efficiency of light extraction, while at the same time reducing the reflection of outside light, the apex angle of the prism can be between 90° and 140°.

EXAMPLES

The present invention will be described in greater detail with reference to examples.

Example 1

About Efficiency of Light Extraction

An organic EL light-emitting apparatus that included a prism member was produced by the following steps.

First, a device illustrated in FIG. 1A was produced. A pattern of triangular column prisms each having an apex angle of 110° at a pitch of 15 μm was formed on an optically isotropic film (sheet of a thickness of 70 μm) by being transferred by ultraviolet curing of an acrylic photocurable resin. This corresponds to the prism member. Additionally, a circular polarizer (a sheet of RD-HL56-W03 from Sanritz Corporation, having a thickness of 100 μm) was provided.

The production of the apparatus according to the exemplary embodiment is completed by laminating an organic EL device, the above prism member, and the circular polarizer together. This is referred to as a laminated member 1.

Then, a device illustrated in FIG. 1B was produced. A pattern of triangular column prisms each having an apex angle of 110° at a pitch of 15 μm was formed on a reversed wavelength dispersion λ/4 phase plate (a sheet of a copolycarbonate film having a thickness of 70 μm) by being transferred by ultraviolet curing of an acrylic photocurable resin. This corresponds to the prism member and the polarizing member. Additionally, a linear polarizer (a sheet of LLC2-82-18 from Sanritz Corporation, having a thickness of 100 μm) was provided. The production of the apparatus according to the exemplary embodiment is completed by laminating the organic EL device, the above reversed wavelength dispersion λ/4 phase plate, and a linearly polarizing member together. This is referred to as a laminated member 2.

In the case in which the organic EL light-emitting apparatus is applied to a display apparatus, when the main observation direction is fixed, the device and the members can be laminated together such that the longitudinal direction of the prism member is substantially aligned with the lateral direction of the panel. This is because, for a horizontally oriented panel, i.e., a rectangular panel, generally, a direction of a longer side seen from the front is observed as the lateral position. The lamination described above achieves a reduction in degradation of brightness even the panel is observed obliquely in the lateral direction.

The members can be laminated together such that the direction of the absorption axis of the polarizing member is substantially perpendicular to the longitudinal direction of the prism member. In this case, interference fringes are not exhibited when outside light is reflected.

An arrangement in which only the organic EL device and the circular polarizer are laminated together is referred to as a ref 1.

In this example, the prismatic surface has an apex angle of 110°. Therefore, the quantity of a horizontally extracted light component, including light that would not be extracted due to total reflection in a known plane, is large.

Figure 6:
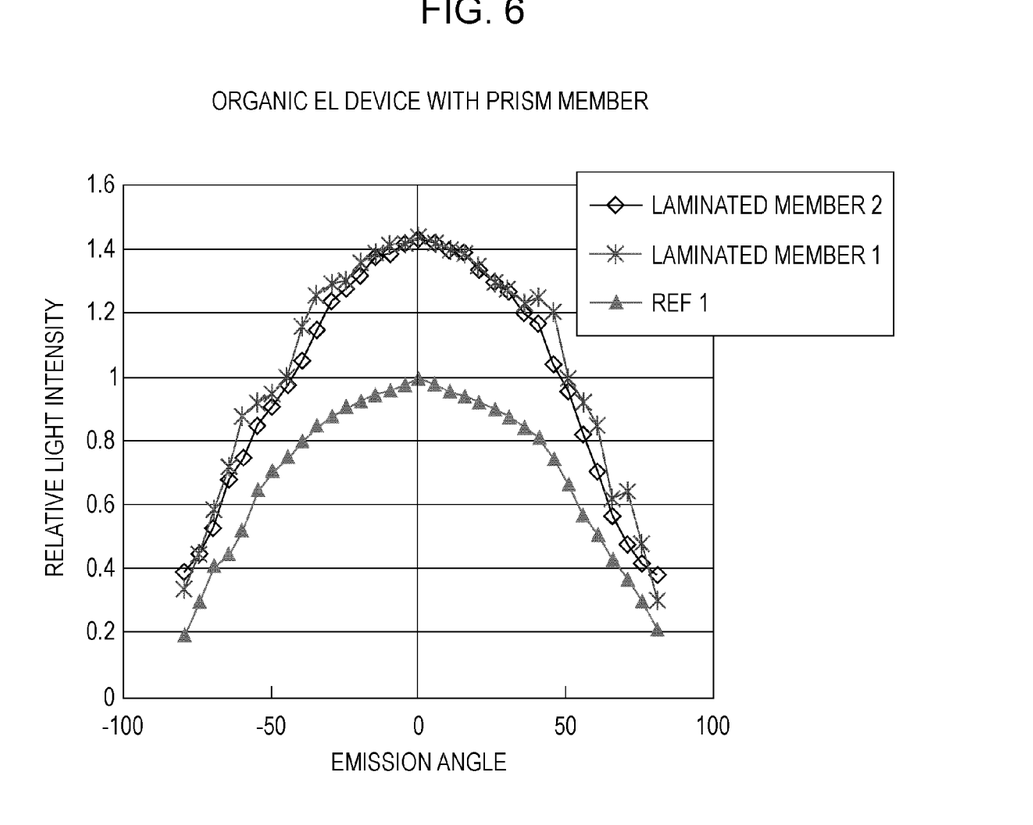
FIG. 6 illustrates a characteristic of an emission angle to emission intensity of an organic EL device laminated with a prism member having an apex angle of 110°.

FIG. 6 shows the dependence of emission intensity on the emission angle of the organic EL device with the prism member having an apex angle of 110° measured with a brightness meter. For both the laminated members 1 and 2, in which the organic EL device and the prism member having an apex angle of 110° were laminated together, the emission intensity in the front increased about 1.4 times the ref 1. Here, the emission angle in the front direction is 0°.

Table 5 shows the result of an examination for determining the dependence of the emission intensity on an angle in the front direction when the prism has an apex angle that varies from 20° to 170°. The ratio of emission intensity in the front indicates a ratio to a flat device that does not include a prism (ref 1).

For an apex angle of 50° or more, the emission intensity in the front direction was large. However, for an apex angle of more than 120°, the emission intensity in a slanting direction decreased. For an apex angle of more than 150°, the emission intensity had similar characteristics to that in the ref 1.

Therefore, from the viewpoint of improving the efficiency of light extraction, the apex angle of the prism can be between 50° and 140°, at which a component of light that exits in the front direction has a large quantity than that of the ref 1.

Example 2

About Antireflection for Outside Light

To evaluate influence of reflection of outside light, a glass substrate with aluminum evaporated thereon was provided. Prism members having different apex angles were bonded to the respective substrates with an acrylic resin. Each of the bonded composites was overlaid with a circular polarizer. The influence of reflection of outside light on these samples were observed and evaluated by use of Gonio-Spectrophotometric Color Measurement System GCMS-11 from Murakami Color Research Laboratory Co., Ltd. More specifically, each sample was irradiated with substantially parallel rays of light from a standard white-light source (xenon lamp) while the incident angle was varied, and the surface of each sample was observed.

Table 4 shows the result of this experiment. When the surface looked black seen from the front and slanting directions (antireflection for outside light was effective), the evaluation is ○. Unfortunately, when the surface looked whitish due to reflection from the surface of the prism member, the evaluation is x. When reflection from the prism member was recognized if observed carefully, the evaluation is Δ.

Similarly, to evaluate influence of reflection of outside light, another glass substrate with aluminum evaporated thereon was provided. A sheet that included a prism pattern for each of different apex angles formed on a reversed wavelength dispersion λ/4 phase plate was bonded to the substrate with an acrylic resin. Each of the bonded composites was overlaid with a linearly polarizing member. The influence of reflection of outside light on these samples were observed and evaluated in a similar way described above.

The result of this experiment is also shown in Table 4. This result substantially matches with a result that a plurality of reflections increase the reflection of outside light, which was obtained in the simulation prediction shown in Table 3. For each of the panels achieving an evaluation of ○, it was difficult to recognize the prism member. For each of the panels of an evaluation of x, the prism member was looked whitish. In particular, for panels that included a prism member that had an apex angle of 60° or less, the prism member was looked noticeably white.

When these samples were observed outdoors in clear weather, a sample that included the circular polarizer had antireflection effects for outside light in the case in which the prism member had an apex angle of 100° or more. A sample that included the linear polarizer and the λ/4 phase plate had antireflection effects for outside light in the case in which the prism member had an apex angle of 90° or more. This result matches with the results shown in Tables 3 and 4.

Therefore, from the viewpoint of antireflection for outside light, the apex angle of the prism can be 90° or more.

P-polarized light that has passed through the prism member (converted to circularly polarized light by passing through the λ/4 phase plate) or circularly polarized light that has passed through the prism member are reflected by the reflecting electrode in the organic EL device. Since the reflected light is inverted and thus absorbed by the linearly polarizing member or the circular polarizer, incident outside light is not reflected finally, and antireflection effects for outside light are obtained.

The results of the above examples reveal that an apex angle of the prism that achieves both an improvement in the efficiency of light extraction and antireflection for outside light is between 90° and 140°.

TABLE 1

VARIATIONS IN EFFICIENCY OF LIGHT EXTRACTION FOR DIFFERENT APEX ANGLES OF PRISM

| APEX ANGLE (°) | EFFICIENCY OF LIGHT EXTRACTION (%) |
|---|---|
| 20 | 29 |
| 30 | 35.7 |
| 40 | 37.4 |
| 60 | 40.5 |
| 90 | 39.2 |
| 120 | 39.8 |
| 140 | 40 |
| 160 | 35.8 |
| FLAT TYPE (COMPARATIVE EXAMPLE) | 20.8 |

TABLE 3

SIMULATION RESULTS OF REFLECTION OF OUTSIDE LIGHT FOR DIFFERENT APEX ANGLES OF PRISM AND DIFFERENT INCIDENT ANGLES OF OUTSIDE LIGHT

| APEX ANGLE OF PRISM (°) | INCIDENT ANGLE (VERTICAL: 0) | | | | |
|---|---|---|---|---|---|
| | 15 | 30 | 45 | 60 | 80 |
| 45 | X | X | X | ○ | X |
| 60 | X | X | X | ○ | ○ |
| 90 | ○-X | ○-Δ | ○ | ○ | ○ |
| 120 | ○ | ○-Δ | ○ | ○ | ○ |
| 140 | ○ | ○ | ○ | ○ | ○ |
| 160 | ○ | ○ | ○ | ○ | ○ |

○: TWO REFLECTIONS DID NOT OCCUR
Δ: TWO REFLECTIONS SLIGHTLY OCCURRED
X: TWO REFLECTIONS OCCURRED

TABLE 4

EVALUATION RESULTS OF REFLECTION OF OUTSIDE LIGHT FOR DIFFERENT APEX ANGLES OF PRISM AND DIFFERENT INCIDENT ANGLES OF OUTSIDE LIGHT

| APEX ANGLE OF PRISM (°) | INCIDENT ANGLE (VERTICAL: 0) | | | | |
|---|---|---|---|---|---|
| | 15 | 30 | 45 | 60 | 80 |
| | WITH CIRCULAR POLARIZER (FIG. 1A) | | | | |
| 45 | X | X | X | X | X |
| 60 | X | X | X | ○ | ○ |

TABLE 2

REFLECTANCE CHARACTERISTICS OF P-POLARIZED LIGHT AND CIRCULARLY POLARIZED LIGHT AT INTERFACE BETWEEN AIR AND LAYER WITH INDEX OF 1.5

| INCIDENT ANGLE (°) | REFLECTANCE OF P-POLARIZED LIGHT (%) | PHASE CHANGE IN P-POLARIZED LIGHT (°) | REFLECTANCE OF NATURAL LIGHT (%) | PHASE CHANGE IN NATURAL LIGHT (°) |
|---|---|---|---|---|
| 0 | 3.1 | 5.2 | 3.1 | 180 |
| 5 | 3.1 | 5.2 | 3.1 | 180 |
| 10 | 3 | 5.2 | 3.1 | 180.1 |
| 15 | 2.8 | 5.1 | 3.1 | 180.2 |
| 20 | 2.5 | 5 | 3.1 | 180.4 |
| 25 | 2.2 | 4.9 | 3.1 | 180.6 |
| 30 | 1.8 | 4.8 | 3.1 | 180.9 |
| 35 | 1.4 | 4.7 | 3.2 | 181.3 |
| 40 | 0.9 | 4.7 | 3.4 | 181.9 |
| 45 | 0.5 | 5 | 3.8 | 182.8 |
| 50 | 0.1 | 6.9 | 4.4 | 185.2 |
| 55 | 0 | 151.3 | 5.5 | 330.1 |
| 60 | 0.3 | 178.5 | 7.3 | 357.8 |
| 65 | 1.6 | 179.7 | 10.3 | 359.5 |
| 70 | 4.7 | 180 | 15.2 | 0 |
| 75 | 11.2 | 180.1 | 23.3 | 0.2 |
| 80 | 24.2 | 180 | 37 | 0.2 |
| 85 | 49.8 | 180 | 60 | 0.1 |

TABLE 4-continued

EVALUATION RESULTS OF REFLECTION OF OUTSIDE LIGHT FOR DIFFERENT APEX ANGLES OF PRISM AND DIFFERENT INCIDENT ANGLES OF OUTSIDE LIGHT

| APEX ANGLE OF PRISM (°) | INCIDENT ANGLE (VERTICAL: 0) | | | | |
|---|---|---|---|---|---|
| | 15 | 30 | 45 | 60 | 80 |
| 70 | X | X | X | Δ | Δ |
| 80 | X | X | Δ | Δ | Δ |
| 90 | ○ | Δ | Δ | ○ | ○ |
| 100 | ○ | ○ | ○ | ○ | ○ |
| 110 | ○ | ○ | ○ | ○ | ○ |
| 120 | ○ | ○ | ○ | ○ | ○ |
| 140 | ○ | ○ | ○ | ○ | ○ |
| 160 | ○ | ○ | ○ | ○ | ○ |
| WITH POLARIZING MEMBER AND PHASE MEMBER (FIG. 1B) | | | | | |
| 45 | X | X | X | X | X |
| 60 | X | X | X | ○ | ○ |
| 70 | Δ | Δ | ○ | Δ | ○ |
| 80 | Δ | ○ | ○ | ○ | ○ |
| 90 | ○ | ○ | ○ | ○ | ○ |
| 100 | ○ | ○ | ○ | ○ | ○ |
| 110 | ○ | ○ | ○ | ○ | ○ |
| 120 | ○ | ○ | ○ | ○ | ○ |
| 140 | ○ | ○ | ○ | ○ | ○ |
| 160 | ○ | ○ | ○ | ○ | ○ |

○: BLACK
Δ: SLIGHTLY WHITISH
X: CONSIDERABLE WHITE

TABLE 5

RATIO OF EMISSION INTENSITY OF DEVICE IN FRONT FOR DIFFERENT APEX ANGLES OF PRISM

| APEX ANGLE (°) | RATIO OF EMISSION INTENSITY IN FRONT |
|---|---|
| 20 | 0.8 |
| 30 | 0.9 |
| 40 | 1 |
| 50 | 1.1 |
| 60 | 1.1 |
| 70 | 1.3 |
| 80 | 1.4 |
| 90 | 1.5 |
| 100 | 1.4 |
| 110 | 1.4 |
| 120 | 1.4 |
| 130 | 1.3 |
| 140 | 1.1 |
| 150 | 1 |
| 160 | 1 |
| 170 | 1.1 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-098001 filed Mar. 31, 2006, which is hereby incorporated by reference herein in its entirety.

What is claimed is:

1. An organic electroluminescent light-emitting apparatus comprising:
    a base;
    an organic electroluminescent light-emitting device on the base, the organic electroluminescent light-emitting device having a pair of electrodes and an organic compound layer disposed between the pair of electrodes;
    a phase member adjacent to a light extraction side of the organic electroluminescent light-emitting device;
    a polarizing member adjacent to a light extraction side of the phase member; and
    a prism member adjacent to a side of the polarizing member that faces the base, the prism member including a plurality of unit prisms each having a triangular-column shape, the unit prisms being arranged such that their longitudinal directions are parallel to one another,
    wherein the prism member has an apex angle between 90° to 140° and wherein the polarizing member, the prism member, the phase member, and the organic electroluminescent light-emitting device are arranged in this order from the light extraction side.

2. An organic electroluminescent light-emitting apparatus, comprising:
    a base;
    an organic electroluminescent light-emitting device on the base, the organic electroluminescent light-emitting device having a pair of electrodes and an organic compound layer disposed between the pair of electrodes;
    a phase member adjacent to a light extraction side of the organic electroluminescent light-emitting device;
    a polarizing member adjacent to a light extraction side of the phase member; and
    a prism member adjacent to a side of the polarizing member that faces the base, the prism member including a plurality of unit prisms each having a triangular-column shape, the unit prisms being arranged such that their longitudinal directions are parallel to one another,
    wherein the prism member has an apex angle between 90° to 140°, and wherein an absorption axis of the polarizing member is substantially perpendicular to a longitudinal direction of the prism member.

* * * * *